United States Patent [19]

West

[11] 4,013,315
[45] Mar. 22, 1977

[54] RAIN CURTAIN ASSEMBLY FOR GOLF CARTS

[76] Inventor: George L. West, 1619 NW. 35th St., Ocala, Fla. 32670

[22] Filed: Aug. 29, 1975

[21] Appl. No.: 609,089

[52] U.S. Cl. .............................. 296/83; 280/DIG. 5; 296/138

[51] Int. Cl.² .......................................... B60J 7/24

[58] Field of Search ................ 296/83, 78 R, 78 A, 296/78.1, 102, 136, 138, 141; 280/DIG. 5; 160/98, 100, 368 S, DIG. 2

[56] References Cited

UNITED STATES PATENTS

| | | | |
|---|---|---|---|
| 527,162 | 10/1894 | Scidmore | 296/83 |
| 864,952 | 9/1907 | Charles | 296/83 |
| 2,423,748 | 7/1947 | Acheson | 296/28 C |
| 2,539,951 | 1/1951 | Hall | 296/102 |
| 2,599,066 | 6/1952 | Osborn | 160/368 S |
| 2,789,863 | 4/1957 | Shimabukuro | 296/78 A |
| 3,338,293 | 8/1967 | Hohmann | 160/368 S |
| 3,709,553 | 1/1973 | Churchill et al. | 296/28 C |

*Primary Examiner*—Robert R. Song
*Assistant Examiner*—David M. Mitchell
*Attorney, Agent, or Firm*—Frederick L. Bergert

[57] ABSTRACT

A rain curtain assembly for a golf cart, including a plurality of panels which are attachable to the surface of the cart by a combination of suction cups and hook means. Tie cords are provided for securing the panels to each other to prevent entry of rain and wind to the passenger compartment of the cart.

5 Claims, 5 Drawing Figures

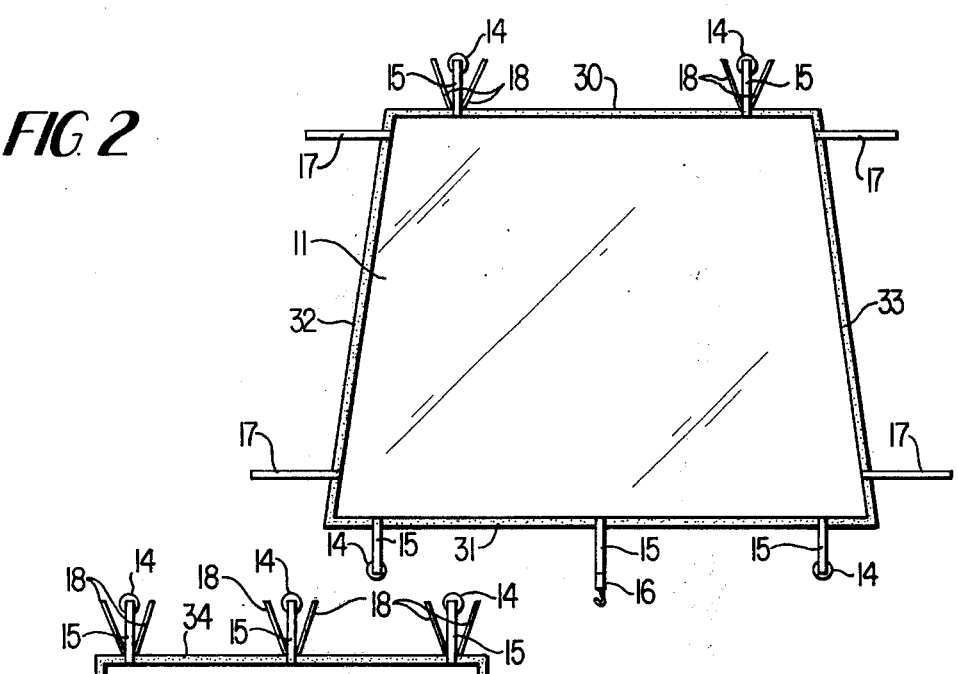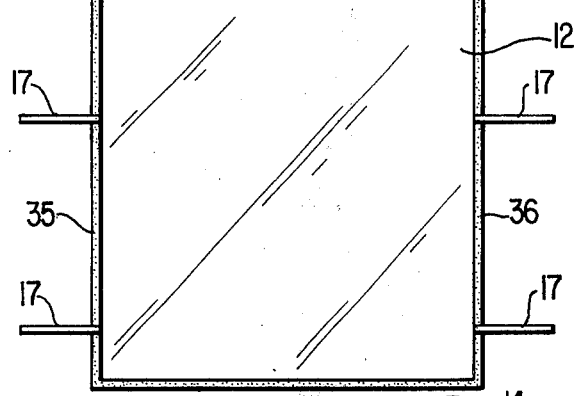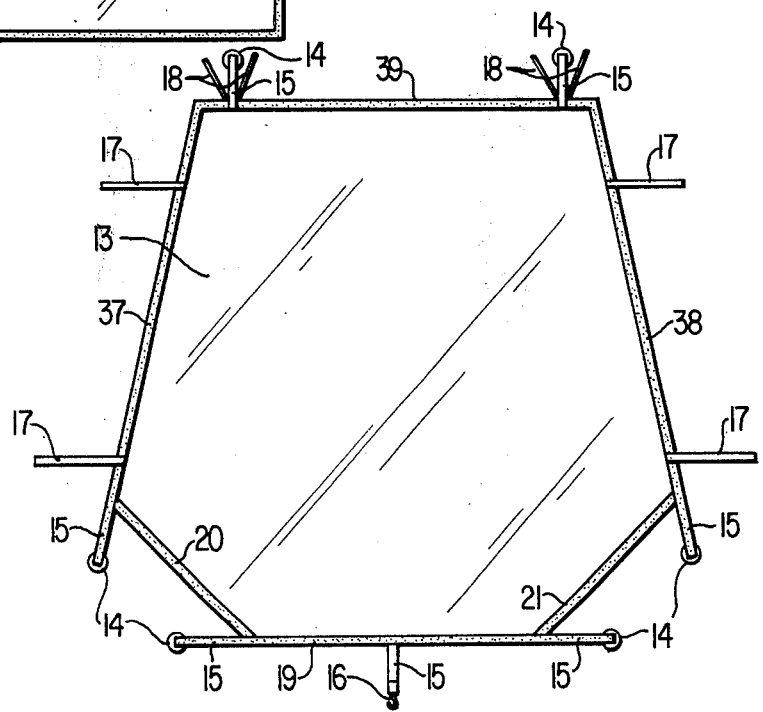

4,013,315

RAIN CURTAIN ASSEMBLY FOR GOLF CARTS

BACKGROUND AND SUMMARY OF THE INVENTION

The present invention is concerned with a rain curtain assembly for a golf cart. More particularly, the present invention is concerned with a rain curtain assembly for the passenger compartment of a golf cart, the assembly including a plurality of panels which are designed to keep the user of the golf cart in a dry condition during rainy weather.

Previous apparatus for maintaining a golf cart user in a dry condition during rainy weather has included curtain arrangements such as, for example, that described in U.S. Pat. No. 3,709,553, which is directed to a golf car rain coat which includes a pair of plastic curtains supported at the top by a guide member which is attached to each side of the roof of the golf cart. Each curtain of this prior art device is designed to be compressible into a bundle at one side of the cart when not in use. Such prior art curtain arrangements have been accompanied by various disadvantages, including the necessity for a permanent mounting installation on the cart and the presence of a bulky mass of material at the side of the carts when the curtains are not in use.

By the present invention, there is provided a rain curtain assembly for a golf cart which includes a plurality of panels which are attachable to the cart by a combination of suction cups and hook means. Tie cords are provided for securing the panels to each other to prevent entry of rain to the interior of the passenger area of the cart. The panels are easily installed or removed and compressible when not in use into a small package which is storable on the inside of a golf bag, for example.

The curtain assembly of the present invention is also useful as a windbreak, particularly during conditions of cold weather. In addition, the curtain assembly may be advantageously employed to maintain the passenger compartment in a clean and dust-free condition during storage of the golf cart.

BRIEF DESCRIPTION OF THE DRAWINGS

The advantages and features of the rain curtain assembly of the present invention will be more clearly understood from the following description of the preferred embodiments, taken in conjunction with the accompanying drawings, wherein:

FIG. 2 is a plan view of the front panel of the present rain curtain assembly;

FIG. 3 is a plan view of one of the side curtains of the present rain curtain assembly;

FIG. 4 is a plan view of the rear panel of the present rain curtain assembly.

DESCRIPTION OF THE PREFERRED EMBODIMENTS

Figure 1:
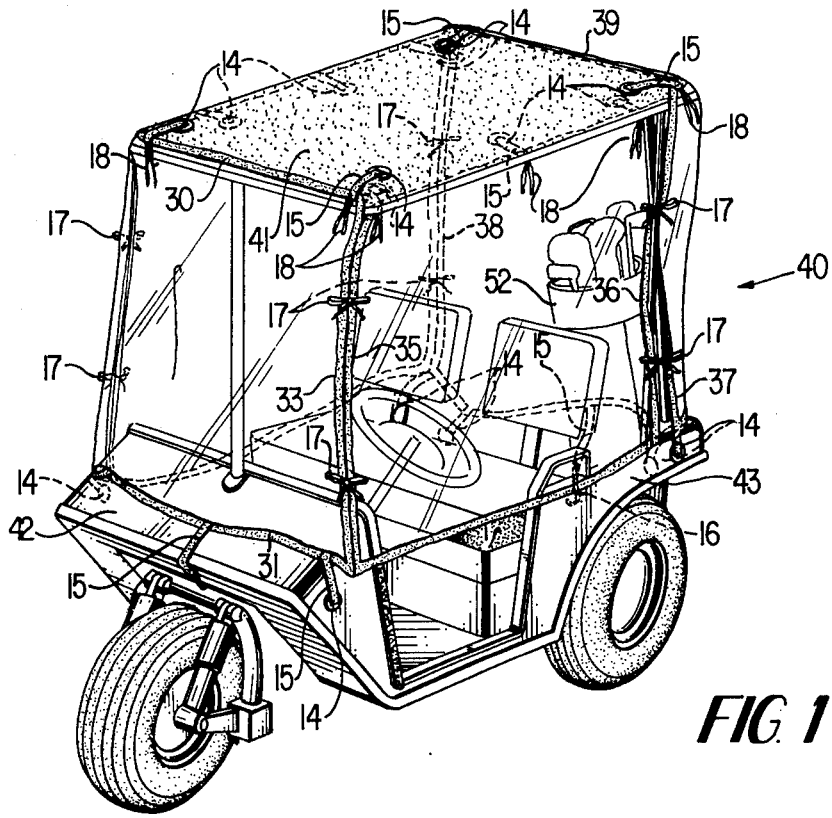
FIG. 1 is a perspective view of a golf cart having installed thereon the rain curtain assembly of the present invention.

In the embodiment of the present invention as shown in FIGS. 1 through 4, there is provided a golf curtain assembly 10 which includes a front panel 11, a pair of side curtains 12 and a rear panel 13. The front panel 11 and side curtains 12 are advantageously made of a material such as a clear polyvinyl chloride, polyvinyl acetate or other similar clear polymeric material, while the rear panel 13 may be made of a frosty polyvinyl material or other similar polymeric material. While polymeric materials are mentioned as being advantageously employed, it should be understood that any of various materials in sheet form, such as a lightweight waterproof cloth material, may also be employed although, particularly for purposes of visibility and to provide a package which is compact when folded, the polymeric materials are preferred.

As shown in FIG. 2, the front panel 11 is provided along its top edge 30 with a pair of suction cups 14, each of which is attached to an elastic strip 15 which is sewn or otherwise connected to one of the outer ends of the top edge 30 of the front panel 11. A pair of similar suction cups 14 are attached by an elastic strip 15 along the outer edge of the bottom edge 31 of the front panel 11, and a wire hook 16 is located therebetween and attached by an elastic strip 15 to the center portion of the bottom edge 31 of the front panel 11. A pair of tie cords 17 are secured to each side edge 32, 33 of the front panel 11 at the upper and lower ends thereof. A pair of tie cords 18 is also secured to the upper edge 30 of the front panel 11 at the point of attachment of each of the elastic strips 15.

The edges 30 through 33 of the front panel 11, as well as the edges of the side curtains 12 and rear panel 13 to be described hereinafter, are preferably provided with a 1 inch wide cloth binding which is sewed to the particular panel or curtain for purposes of providing strength and shape. Each of the suction cups 14 may be of a diameter such as about 1 ¾ to 3 inches and with the elastic strips 15 being approximately 5 to 6 inches in length and ¾ to 1 inch in width. Generally, larger suction cups 14 having a diameter of about 3 inches are employed at the top edges of the front 11 and rear 13 panels to provide additional strength, while suction cups 14 of a smaller size, about 1 $\mu$ inch in diameter are employed at the remaining positions of the assembly 10. The tie cords 17 may be of nylon or other suitable material, with a length of about 8 inches and a width of about ⅛ inch. The tie cords 18 on the top edges of the panels and curtains may also be of nylon or similar material, having a length of about 6 inches and a width of about ⅛ inch. Such dimensions are provided only for purposes of describing specific examples which have been employed with good results.

The front panel 11 is advantageously shaped as a trapezoid in order to provide a close fit with the side curtains 12. Thus the two parallel sides of the tapezoidal shaped front panel 11 are the top 30 and bottom 31 edges of the panel 11, and with the bottom edge 31 being of greater length than the top edge 30.

Each of the side curtains 12 is of generally rectangular shape, as shown in FIG. 3, and with three suction cups 14 attached by elastic strips 15 along the top edge 34 of each of the side curtains 12, along with tie cords 18 which are attached in pairs to the top edge 34 of the side curtains 12 at the point of attachment of the elastic strips 15. A pair of tie cords 17 is also attached to and spaced along each of the two vertical sides 35, 36 of each of the side curtains 12.

As shown in FIG. 4, the rear panel 13 is of a generally trapezoidal shape, but with the bottom edge of the panel 13 being provided with a central horizontal portion 19 and upwardly inclined portions 20, 21 at each end of the bottom edge which intersect the side edges 37, 38 of the panel 13. The length of the central horizontal portion 19 is preferably greater than that of either of the inclined portions 20, 21 to provide a wraparound effect at the rear of the golf cart. As in the case of the front panel 11, the real panel 13 has its sides tapered inwardly toward the top, with the top and bottom edges being generally parallel, the top edge 39 being shorter than the bottom edge which includes portions 19, 20 and 21.

A suction cup 14 is attached to the rear panel 13 at the intersection of each side edge 37, 38 with the respective upwardly inclined bottom edge portions 20, 21, these suction cups 14 on either side being connected to the panel 13 by an elastic strip 15 which extends downwardly on a line with the respective side edge 37 or 38 as an extension thereof. A suction cup 14 and elastic strip 15 connector is also provided at each end of the central edge portion 19 of the panel 13, with each of these suction cups 14 being connected to the respective edge by an elastic strip 15 which extends horizontally in either direction as an extension of the horizontal central edge 19. This latter described arrangement of the four suction cups 14 relative to the inclined bottom edge portions 20, 21 and central edge portion 19 has been found to alleviate stresses in the rear panel 13 and also to provide for maximum retention of the panel 13 at its lower edge. A wire hook 16 similar to that employed with the front panel 11 is attached to an elastic strip 15 which is secured to the central horizontal edge 19 at approximately its midpoint.

At the upper edge 39 of the rear panel 13, there is provided a pair of suction cups 14 which are secured to the upper edge 39 by an elastic strip 15, one cup 14 in proximity to each end of the upper edge 39, and with a pair of tie cords 18 secured to the upper edge 39 at the point of attachment of each of the elastic strips 15. Also, on each of the side edges 37, 38 of the rear panel 13, there is provided a pair of tie cords 17 which extend generally in a horizontal position.

In order to install the rain curtain assembly 10 of the present invention, the front panel 11 is installed with the two suction cups 14 at the upper edge 30 being pressed down on the outer surface of the horizontal top 41 of the golf cart 40, as shown in FIG. 1, and with the suction cups 14 on the bottom edge 31 being similarly attached to the forward frame 42 of the golf cart 40. The hook 16 at the bottom center edge 31 of the front panel 11 is hooked under the front end of the forward frame 42 of the golf cart 40.

In order to install the side curtains 12, the suction cups 14 on the upper edge 34 of the side curtains 12 are pressed upwardly and secured upon the inner surface of the top 41 of the golf cart 40, and the tie cords 17 on the vertical sides 35, 36 of each of the side curtains 12 are then in position to be tied to the tie cords 17 on the front 11 and rear 13 panels.

The rear panel 13 is installed by applying the suction cups 14 at the upper edge 39 to the outer surface of the top 41 of the golf cart 40, and the outer suction cup 14 on each lower edge 20, 21 of the panel 13 is attached to the side of the rear frame 43 of the golf cart 40, while the two suctions cups 14 on the central portion 19 of the bottom edge of the rear panel 13 are attached to the rear vertical surface of the rear frame 43 of the golf cart 40. The hook 16 in the center of the lower edge 19 of the rear panel 13 may then be attached to the lower horizontal surface of the rear frame 43 of the golf cart 40. By the use of the various suction cups 14 and wire hook 16 arrangements, it is apparent that the panels 11, 13 and side curtains 12 may be stretched taut as necessary in order to be adapted to the particular golf cart with which the assembly 10 is employed.

Upon installation of the panels 11, 13 and side curtains 12, it is necessary only to untie the tie cords 17 connecting the side curtain 12 on either side with the front panel 11, in order to enter or exit from the golf cart 40. In some weather conditions, it may be sufficient to install only the front 11 and rear 13 panels, to provide sufficient protection.

The rain curtain assembly 10 of the present invention is easily removed from the golf cart 40, by releasing the suction cups 14 and hooks 16 from engagement with the cart 40. Also, the tie cords 18 may be employed to tie the respective panels 11, 13 and side curtains 12 in a folded-up condition on the cart 40 when not in use.

Figure 5:
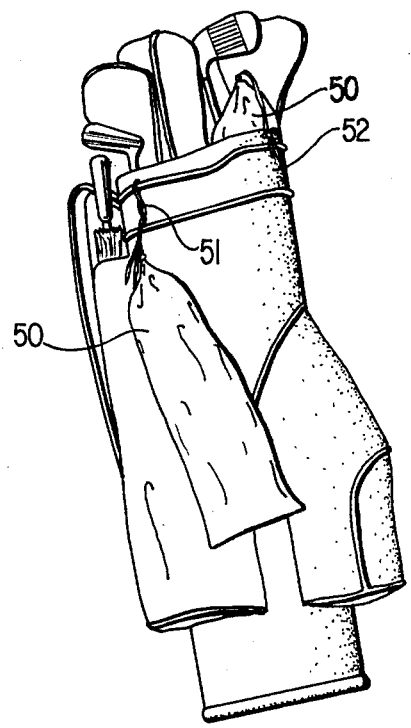
FIG. 5 is a perspective view of the present rain curtain assembly in a folded condition within a carry bag which is attached to a golf bag.

In FIG. 5 there is shown a carry bag 50 in which the rain curtain assembly 10 of the present invention, including panels 11, 13 and curtains 12, may be stored in a folded condition when not in use. The carry bag 50 is provided with a draw string top, with the strings 51 thereof being attachable to a golf bag 52. Alternatively, the carry bag 50 may be carried inside the golf bag 52. The panels 11, 13 and side curtains 12 may be folded or rolled up, secured with means such as rubber bands and suitably marked as the "front panel," etc. prior to insertion in the bag 50.

It is thought that the invention and many of its attendant advantages will be understood from the foregoing description, and it will be apparent that various changes may be made in the form, construction and arrangement of the parts without departing from the spirit and scope of the invention or sacrificing its material advantages, the forms hereinbefore described being merely the preferred embodiments thereof.

It is claimed:

1. A rain curtain assembly for a golf cart, having a passenger compartment with a top overlying said passenger compartment, comprising: a front panel, a rear panel and a pair of side panels, each of said front, rear and side panels having at least one suction cup connected by elastic means to the upper edge thereof and at least one suction cup connected by elastic means to the lower edge of each of said front and rear panels, a hook member connected by elastic means to the center portion of the lower edge of each of said front and rear panels, said suction cups and hook members providing releasable engagement with said golf cart, each of said front and rear panels having at least one tie cord on each side edge thereof, and each of said side panels having at least one tie cord on each side edge thereof for releasable tying engagement with a tie cord of one of said front or rear panels.

2. The rain curtain assembly of claim 1, wherein the front and rear panels have a trapezoidal shape.

3. The rain curtain assembly of claim 2, wherein the bottom edge of the rear panel is provided with a central horizontal portion and upwardly inclined portions at each end of the bottom edge which intersect the side edges of the rear panel.

4. The rain curtain assembly of claim 3, wherein a suction cup is attached to the rear panel at the intersection of each side edge with the upwardly inclined bottom edge, each of said cups being attached by an elastic strip which extends downwardly on a line with the side edge as an extension thereof, and wherein a suction cup with elastic strip connector is provided at each end of the central horizontal portion of the bottom edge of the rear panel, said elastic strip connectors extending horizontally as extensions of the central horizontal portion.

5. The rain curtain assembly of claim 4, further including at least one set of tie cords located at the top edge of each of the front panel, the rear panel and the side panels for tying said panels in a folded-up condition on the top of said golf cart.

* * * * *

UNITED STATES PATENT AND TRADEMARK OFFICE
CERTIFICATE OF CORRECTION

PATENT NO.  : 4,013,315
DATED       : March 22, 1977
INVENTOR(S) : George L. West It is certified that error appears in the above-identified patent and that said Letters Patent are hereby corrected as shown below:

Column 2, line 40, "1 µ inch" should read -- 1 3/4 inches --; line 52, "tapezoidal" should read -- trapezoidal --.

Signed and Sealed this nineteenth Day of July 1977

[SEAL]

Attest:

RUTH C. MASON
Attesting Officer

C. MARSHALL DANN
Commissioner of Patents and Trademarks